Nov. 13, 1945.   C. G. WYNNE   2,389,016
OPTICAL OBJECTIVE
Filed July 20, 1943
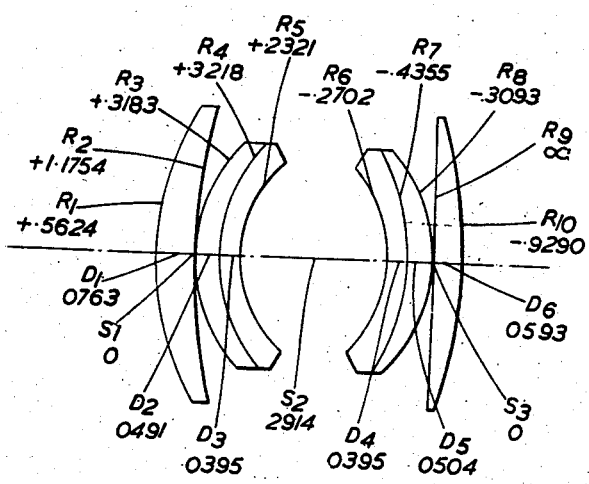
Inventor
C. G. WYNNE
By
Attorneys Patented Nov. 13, 1945

2,389,016

UNITED STATES PATENT OFFICE 2,389,016

OPTICAL OBJECTIVE

Charles Gorrie Wynne, Leicester, England

Application July 20, 1943, Serial No. 495,497
In Great Britain March 10, 1943

7 Claims. (Cl. 88—57)

This invention relates to optical objectives for photographic or other purposes, corrected for spherical and chromatic aberrations, coma, astigmatism, field curvature and distortion, and of the kind comprising two compound divergent meniscus components located between two simple convergent components and having their concave air-exposed surfaces facing the diaphragm.

Such an objective as usually constructed has considerable over-corrected oblique spherical aberration, so that to maintain good definition it is necessary to reduce the effective oblique aperture by vignetting by the edges of the front and rear convergent components. This reduces the effective exposure at the edges, and sometimes constitutes a serious drawback for example in colour photography, where the exposure is extremely critical.

The present invention has for its object to provide an objective of the above type having considerably improved oblique spherical aberration correction, whereby the effective diameters of the front and rear components can be materially increased without loss of definition in the image.

This is achieved according to the invention by making the axial air separation between the concave air-exposed surfaces of the two divergent components greater than .27 times the equivalent focal length of the objective, and preferably less than .33 times such focal length.

Each divergent component is conveniently in the form of a doublet comprising a convergent element and a divergent element, and the four convergent elements are preferably made of materials having mean refractive index between 1.70 and 1.80 and Abbe V number greater than 50.0 and preferably between 50.0 and 58.0. The two divergent elements are preferably made of materials having mean refractive index between 1.62 and 1.68 and Abbe V number between 21.0 and 31.0. It is especially convenient to use potassium iodide crystal for the two divergent elements in combination with magnesium oxide crystal, in the form known as β-magnesium oxide for the four convergent elements. These two materials have approximately the same relative partial dispersion, thereby giving good secondary spectrum correction.

The single figure of the accompanying drawing illustrates the invention.

Numerical data for a convenient practical example of objective according to the invention are given in the following table, in which $R_1$ $R_2$ ... represent the radii of curvature of the individual surfaces, the positive sign indicating that the surface is convex to the front (that is to the side of the longer conjugate) whilst the negative sign indicates that the surface is concave to the front, $D_1$ $D_2$ ... represent the axial thicknesses of the individual elements, and $S_1$ $S_2$ $S_3$ represent the axial air separations between the various components. The table also gives the mean refractive indices for the D-line, the Abbe V numbers and the relative partial dispersions of the materials used for the elements.

| Equivalent focal length 1.000. Relative aperture F/2 | | | | |
|---|---|---|---|---|
| Radius | Thickness or air separation | Refractive index $n_D$ | Abbe V number | Relative partial dispersion $\theta$ |
| $R_1+$ .5624 | | | | |
| $R_2+$1.1754 | $D_1$ .0763 | 1.7378 | 53.5 | .989 |
| $R_3+$ .3183 | $S_1$ 0.0 | | | |
| $R_4+$ .3218 | $D_2$ .0491 | 1.7378 | 53.5 | .989 |
| $R_5+$ .2321 | $D_3$ .0395 | 1.6634 | 21.4 | .988 |
| $R_6-$ .2702 | $S_2$ .2914 | | | |
| $R_7-$ .4355 | $D_4$ .0395 | 1.6634 | 21.4 | .988 |
| $R_8-$ .3093 | $D_5$ .0504 | 1.7378 | 53.5 | .989 |
| $R_9\infty$ | $S_3$ 0.0 | | | |
| $R_{10}-$ .9290 | $D_6$ .0593 | 1.7378 | 53.5 | .989 |

In this example the same material, namely potassium iodide crystal, is used for the two divergent elements, and the four convergent elements are likewise all made of the same material, namely magnesium oxide crystal in the form known as β-magnesium oxide.

It will be noticed that the middle air separation is .2914 times the equivalent focal length of the objective, and that the two outer air separations are each reduced to zero.

What I claim as my invention and desire to secure by Letters Patent is:

1. An optical objective for photographic or other purposes, corrected for spherical and chromatic aberrations, coma, astigmatism, field curvature and distortion, and comprising two simple convergent components, and two compound divergent meniscus components located between the convergent components, and having their concave air-exposed surfaces facing one another and axially separated from one another by a distance lying between .27 and .33 times the equivalent focal length of the objective the radii of the front and rear surfaces of the front compound divergent component respectively lying between .30 and .35 and between .20 and .26, and those of the rear compound divergent component respectively between .24 and .31 and between .27 and .35 times the equivalent focal length.

2. An optical objective for photographic or other purposes, corrected for spherical and chromatic aberrations, coma, astigmatism, field curvature and distortion, and comprising two simple convergent components, and two compound divergent meniscus components located between the convergent components and each consisting of a convergent element and a divergent element, the divergent components having their concave air-exposed surfaces facing one another and axially separated from one another by a distance lying between .27 and .33 times the equivalent focal length of the objective the radii of the front and rear surfaces of the front compound divergent component respectively lying between .30 and .35 and between .20 and .26, and those of the rear compound divergent component respectively between .24 and .31 and between .27 and .35 times the equivalent local length.

3. An optical objective as claimed in claim 2, in which the two divergent elements are each made of a material having mean refractive index between 1.62 and 1.68 and Abbe V number between 21.0 and 31.0.

4. An optical objective as claimed in claim 2, in which the four convergent elements are each made of a material having mean refractive index between 1.70 and 1.80 and Abbe V number greater than 50.0.

5. An optical objective as claimed in claim 2, in which the two divergent elements are each made of a material having mean refractive index between 1.62 and 1.68 and Abbe V number between 21.0 and 31.0 and the four convergent elements are each made of a material having mean refractive index between 1.70 and 1.80 and Abbe V number greater than 50.0.

6. An optical objective as claimed in claim 2, in which potassium iodide crystal is used for the two divergent elements and magnesium oxide crystal is used for the four convergent elements.

7. An optical objective having numerical data substantially as set forth in the following table:

| Equivalent focal length 1.000. Relative aperture F/2 | | | | |
|---|---|---|---|---|
| Radius | Thickness or air separation | Refractive index $n_D$ | Abbe V number | Relative partial dispersion $\theta$ |
| $R_1+ .5624$ | $D_1 .0763$ | 1.7378 | 53.5 | .989 |
| $R_2+1.1754$ | $S_1 0.0$ | | | |
| $R_3+ .3183$ | $D_2 .0491$ | 1.7378 | 53.5 | .989 |
| $R_4+ .3218$ | $D_3 .0395$ | 1.6634 | 21.4 | .988 |
| $R_5+ .2321$ | $S_2 .2914$ | | | |
| $R_6- .2702$ | $D_4 .0395$ | 1.6634 | 21.4 | .988 |
| $R_7- .4355$ | $D_5 .0504$ | 1.7378 | 53.5 | .989 |
| $R_8- .3093$ | $S_3 0.0$ | | | |
| $R_9 \infty$ | $D_6 .0593$ | 1.7378 | 53.5 | .989 |
| $R_{10}- .9290$ | | | | | in which $R_1 R_2 \ldots$ represent the radii of curvature of the individual surfaces, the positive sign indicating that the surface is convex to the front (that is to the side of the longer conjugate) whilst the negative sign indicates that the surface is concave to the front, $D_1 D_2 \ldots$ represent the axial thicknesses of the individual elements, and $S_1 S_2 S_3$ represent the axial air separations between the various components.

CHARLES GORRIE WYNNE.